United States Patent [19]
Dent et al.

[11] Patent Number: 5,594,795
[45] Date of Patent: Jan. 14, 1997

[54] METHOD AND APPARATUS FOR KEY TRANSFORMS TO DISCRIMINATE BETWEEN DIFFERENT NETWORKS

[75] Inventors: Paul W. Dent, Steaag, Sweden; Alex K. Raith, Durham, N.C.

[73] Assignee: Ericsson Inc., Research Triangle Park, N.C.

[21] Appl. No.: 270,565

[22] Filed: Jul. 5, 1994

[51] Int. Cl.$^6$ .............................. H04N 9/32; H04N 9/16
[52] U.S. Cl. ................................. 380/23; 380/21
[58] Field of Search ...................... 350/23, 21

[56] References Cited

U.S. PATENT DOCUMENTS

| | | | |
|---|---|---|---|
| 4,549,308 | 10/1985 | LePinto | 380/21 X |
| 5,153,919 | 10/1992 | Reeds, III et al. | 380/21 X |
| 5,309,501 | 5/1994 | Kuzik et al. | 380/23 X |

*Primary Examiner*—Gilberto Barrón, Jr.
*Attorney, Agent, or Firm*—Eric L. Stasik

[57] ABSTRACT

A method and apparatus is presented for transforming a key variable used for scrambling cellular data traffic between a terminal and a network in alternate ways using information transmitted to the terminal from the network with which the terminal is connected. Transformation is accomplished by passing portions of the key variable through a series of S-boxes which provide a mapping between the input and output. Moreover, it is disclosed how to save memory by iteratively passing portions of the key variable through the same S-box.

26 Claims, 3 Drawing Sheets

METHOD AND APPARATUS FOR KEY TRANSFORMS TO DISCRIMINATE BETWEEN DIFFERENT NETWORKS

FIELD OF THE INVENTION

The present invention belongs to the field of anti-fraud and privacy systems for public or private wireless communications systems, such as digital cellular telephone systems. Such systems may use authentication procedures for verifying the identity of a cellular mobile telephone attempting to access the cellular network or to verify the cellular network to the cellular mobile telephone, as well as scrambling to prevent traffic data broadcast to or from one cellular mobile telephone accidentally or deliberately being received by another cellular mobile telephone.

BACKGROUND OF THE INVENTION

Cellular mobile telephones and other such radio communications devices are usually designed to a meet the requirements of a limited number of standards in common use in the world. Many countries choose the same standard; for example the pan-European GSM system is used by 14 European countries, Australia and some Middle Eastern countries. The U.S. digital cellular standard, IS-54B Cellular System Dual-Mode Mobile Station-Base Station Compatibility Standard (available from the Telecommunications Industry Association, 2001 Pennsylvania Avenue, N.W., Washington D.C., 20006), (IS-54B) is used, for example, in the USA, Mexico, Canada and South America. Throughout the following, the terms cellular mobile telephone, cellular phone, cellular telephone, mobile telephone, 'phone', radiotelephone terminal, cellular terminal, and "terminal" may be used equivalently to refer to a wireless communications device capable of wirelessly transmitting and receiving data. Also, the terms radiotelephone network, cellular system, and cellular network are used equivalently to refer to a wireless communications system which provides wireless data connections between two or more terminals or between two or more terminals and other equipment. Cellular mobile telephones are produced in enormous volume and it is therefore desirable that the design be the same for all markets.

One problem that exists is that cellular telephone numbers, also referred to as the mobile identification number (MIN), are re-used in other countries. A particular MIN is not guaranteed to be unique in the whole world. For example, a cellular telephone brought to the US by a traveler from another country which uses the same cellular standard as is used in the U.S., may have the same telephone number as a native American phone, and can sometimes access the network in an unforeseen and unauthorized manner. Fraudulent access is also a problem. It is an object of anti-fraud systems to prevent such unauthorized access.

Anti-fraud systems make use of a secret number such as a personal identification number (PIN code) embedded into every phone. The PIN code stored in the cellular phone is also stored in the cellular telephone exchange, or network exchange, belonging to the operator with which the user has a subscription, i.e. the so called "home system." A cellular network is comprised of many such exchanges, or switches, and associated base stations. A cellular phone attempting to access the cellular network is "challenged" with a random number broadcast by a base station which the cellular phone will receive and combine with the secret PIN code in a pre-defined manner. The cellular phone then transmits a response back to the base station for comparison in and verification by the network. If the cellular phone is roaming outside its home system, the roaming network in the meanwhile challenges the phone's home system with the same random number. If the result transmitted from the cellular phone matches that received from the home system, the cellular phone is admitted to the network and the network is fairly certain that its bill for services can be sent to the phone's home operator and that it will be honored. This procedure, an other similar procedures, are referred to as authentication procedures.

While it may not be too difficult to ensure that unique PIN codes are issued to all cellular phones registered with a particular operator, it is not so obvious how to coordinate PIN code issue between operators to guarantee uniqueness, without compromising security by having too many organizations with access to secret information. Further, it is not very likely at all that coordination could be achieved between continents. Therefore the present invention provides a means of discriminating the security information between different networks such that uniqueness of the information is not a necessity.

U.S. Pat. No. 5,091,942, entitled "Authentication System for Digital Cellular Communication Systems" by Paul Dent, assigned to the same assignee as the present invention incorporated herein its entirety by reference, discloses a bilateral authentication procedure that verifies a mobile phone to the cellular network and vice-versa. The bilateral authentication system disclosed therein also produces, as a byproduct, a temporary variable to be used for scrambling traffic data signals. U.S. Pat. No. 5,060,266, entitled "Continuous Cypher Synchronization for Cellular Communication Systems" by Paul Dent, assigned to the same assignee as the present invention incorporated herein its entirety by reference, describes a type of scrambling system for scrambling data traffic signals. A suitable algorithm for so doing is described in pending U.S. Pat. No. 5,148,485 entitled "Encryption System for Digital Cellular Communications" by Paul Dent, assigned to the same assignee as the present invention incorporated herein its entirety by reference.

The referenced prior art discloses the use of a 64-bit temporary key, which is produced during the authentication procedure, to generate, with the aid of a speech frame or TDMA transmission frame counter, a block of keystream bits for every frame which may be exclusive-ORed to traffic data to prevent the data traffic from being received by a radio not in possession of the same 64 bits.

The known prior art does not provide a means to ensure that different radios, designed to meet the requirements of the same cellular standards, which are delivered to perhaps different continents and accidentally in possession of the same 64-bit key cannot receive or transmit the same signal.

SUMMARY OF THE INVENTION

In view of the foregoing background, it is therefore an object of the present invention to provide a means whereby portable communications devices such as cellular phones can be delivered all over the world to the same design without compromising the security of anti fraud and privacy features in any one country or continent.

The present invention provides a method of determining a key for scrambling data traffic between a radiotelephone terminal and a radiotelephone network which is dependent on the radiotelephone network that is providing a data or voice communications service to the terminal. The technique comprises transmitting a random number from the cellular network to a cellular telephone which is used to carry out an authentication procedure. The authentication procedure results in the generation of a session key. Along with the random number, the cellular network may also transmit an indication of the type of network providing service to the cellular telephone. The cellular telephone transforms the session key to a transformed session key in dependence on the indication of the type of network and uses the transformed session key to scramble traffic passed between said network and said terminal.

In an alternate embodiment of the present invention, a method of determining a key for scrambling data traffic between a radiotelephone terminal and a radiotelephone network is described in which the session key is transformed in dependence of the indication of network type by means of substituting values for parts of the session key using a substitution table or S-box that depends on the network type indication. The substituted values are formed using first combinations of parts of the session key with parts of a random number, a logical channel number or traffic direction indication. Values are substituted for the first combinations using a substitution table or S-box that depends on the network type indication. Second combinations are formed between parts of the session key and a transformed session key is produced by combining the substituted values with the second combinations.

These and other features and advantages of the present invention will be readily apparent to one of ordinary skill in the art from the following written description when read in conjunction with the drawings in which like reference numerals refer to like elements.

DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
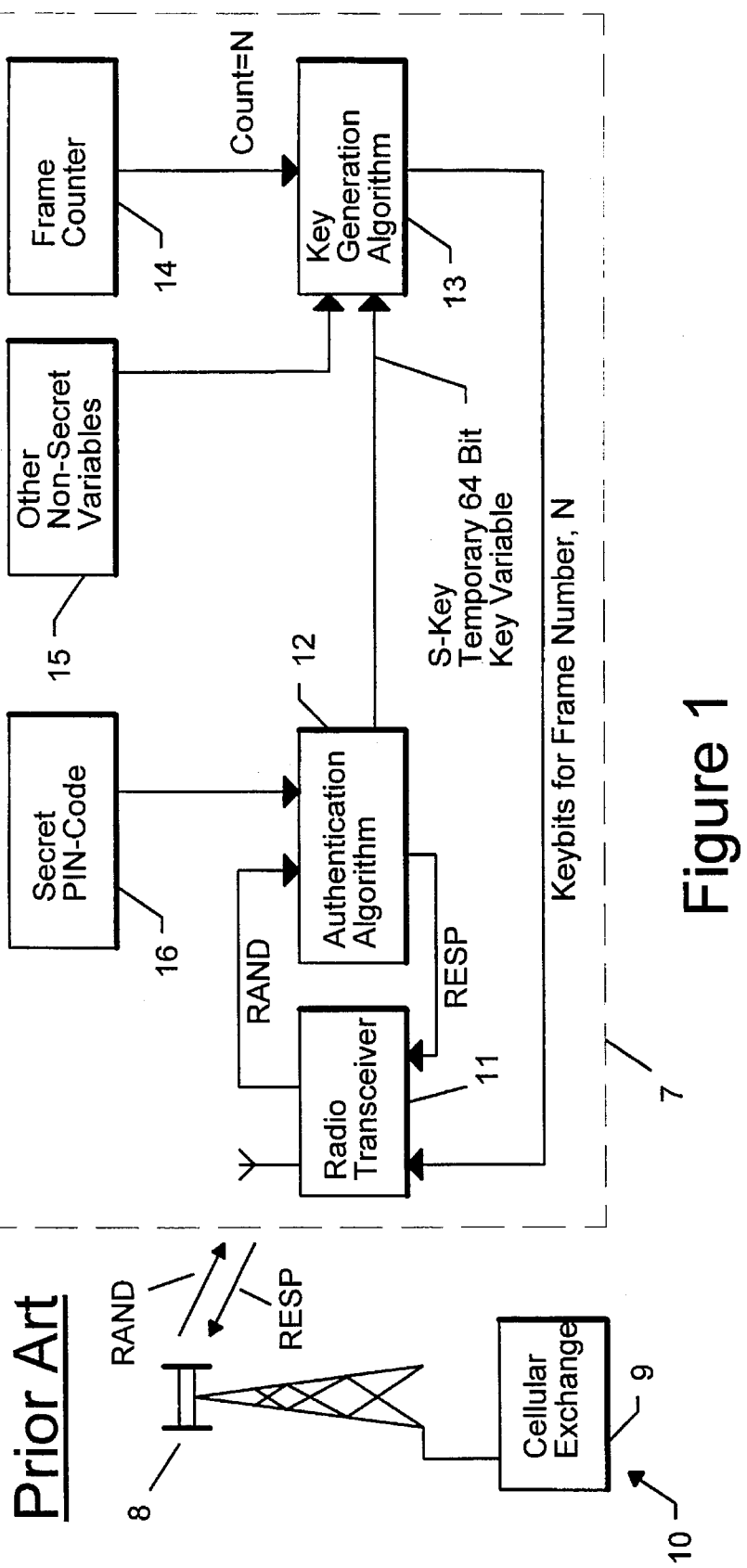
FIG. 1 is a schematic illustration of a prior art communication system showing the connection between the authentication and keystream generation system.

A brief description of the existing prior art will be helpful in understanding the operation of the present invention. FIG. 1 schematically illustrates a cellular network 10 in radio communication with a cellular phone 7. Cellular network 10 is comprised of cellular base station 8 and the cellular exchange 9. As is obvious to one of ordinary skill a typical cellular exchange 9 may be coupled to a plurality of base stations 8. Further, a typical cellular network 10 may comprise hundreds of base stations 8 and a plurality of interconnected cellular exchanges 9. Cellular phone 7 comprises, in addition to other elements not shown, radio transceiver 11, authentication algorithm 12, key generation algorithm 13, frame counter 14, secret PIN code 16, and other non-secret variables 15. Items 12, 13, and 14 may be integrated into a single microprocessor such as a Texas Instruments TMSC320C50, but are shown as separate functional blocks to illustrate clearly the connections between these functions. Items 15 and 16 are stored in an appropriate memory device, such as a read only memory (ROM). Radio transceiver 11 may be designed to provide radio communications in accordance with the aforementioned IS-54B standard according to known methods.

During the authentication procedure previously mentioned, cellular telephone 7 receives, from time to time, a radio signal comprising an authentication challenge. The authentication challenge includes a random number (RAND) generated by cellular network 10 and broadcast via cellular base station 8. The radio signal containing RAND is received, demodulated and decoded according to known methods by radio transceiver 11 which is coupled to the authentication algorithm 12. Authentication algorithm 12 combines RAND with secret PIN code 16 to generate a response RESP which the transceiver 11 transmits to base station 8 and where it is subsequently received by cellular network 10. An example of an authentication algorithm 12 is described in detail in U.S. Pat. No. 5,091,942. A byproduct of the authentication algorithm 12 is a 64-bit temporary key variable, known as the session key (S-key), which is coupled to key generation algorithm 13 to be used for scrambling data traffic for a period of time until the next time the S-key is changed by a new authentication challenge. This can happen once per conversation if desired for security reasons. The key generator uses the value of S-key, which is fixed for a period of time, together with the frame counter N 14, which systematically varies during said period of time, to produce a non-repetitive sequence of pseudo-random keystream bits for overlaying data traffic according to known methods. An example of a key generation algorithm 13 is described in detail in U.S. Pat. No. 5,060,266.

In this prior art system, it is not impossible to ensure that all cellular phones 7 operating in, for example, the North American continent have unique PIN codes 16 as there is automatic, interswitch signaling between cellular networks 10 for the purposes of providing roaming. It is, however, difficult to ensure that unique PIN codes 16 can be assigned to cellular telephones 7 intended for use on other continents which have cellular systems not inter-connected via interswitch signaling to, for example, the North American cellular network. It is very possible, for example, that some one of the millions of cellular phones 7 delivered to other continents utilizing cellular phones 7 according to the same cellular standard, will have the same PIN code 16 as used by some one of the millions of cellular phones 7 operating in North America and thus, when challenged with the same RAND, to produce the same 64-bit S-key. A "foreign" cellular phone 7 having the same PIN code 16 as an authorized cellular phone 7 also operating in North America will therefore produce the same keystream sequence for scrambling purposes and will be able to "listen-in" on a supposedly secure link. It is also possible that PIN codes may be duplicated deliberately for the illegal purposes.

The probability of having the same S-key in two cellular phones 7 using the prior art system of FIG. 1 is two to the power minus 64. Although statistically infrequent, the technique described in FIG. 1 can never guarantee that duplication will not happen. It is even more undesirable that a pair of cellular phones 7 having the same PIN code 16 produce the same S-key when challenged with the same RAND. It is, however, less worrisome if two cellular phones having the same PIN code 16 produce the same S-key in response to different authentication challenges.

Figure 2:
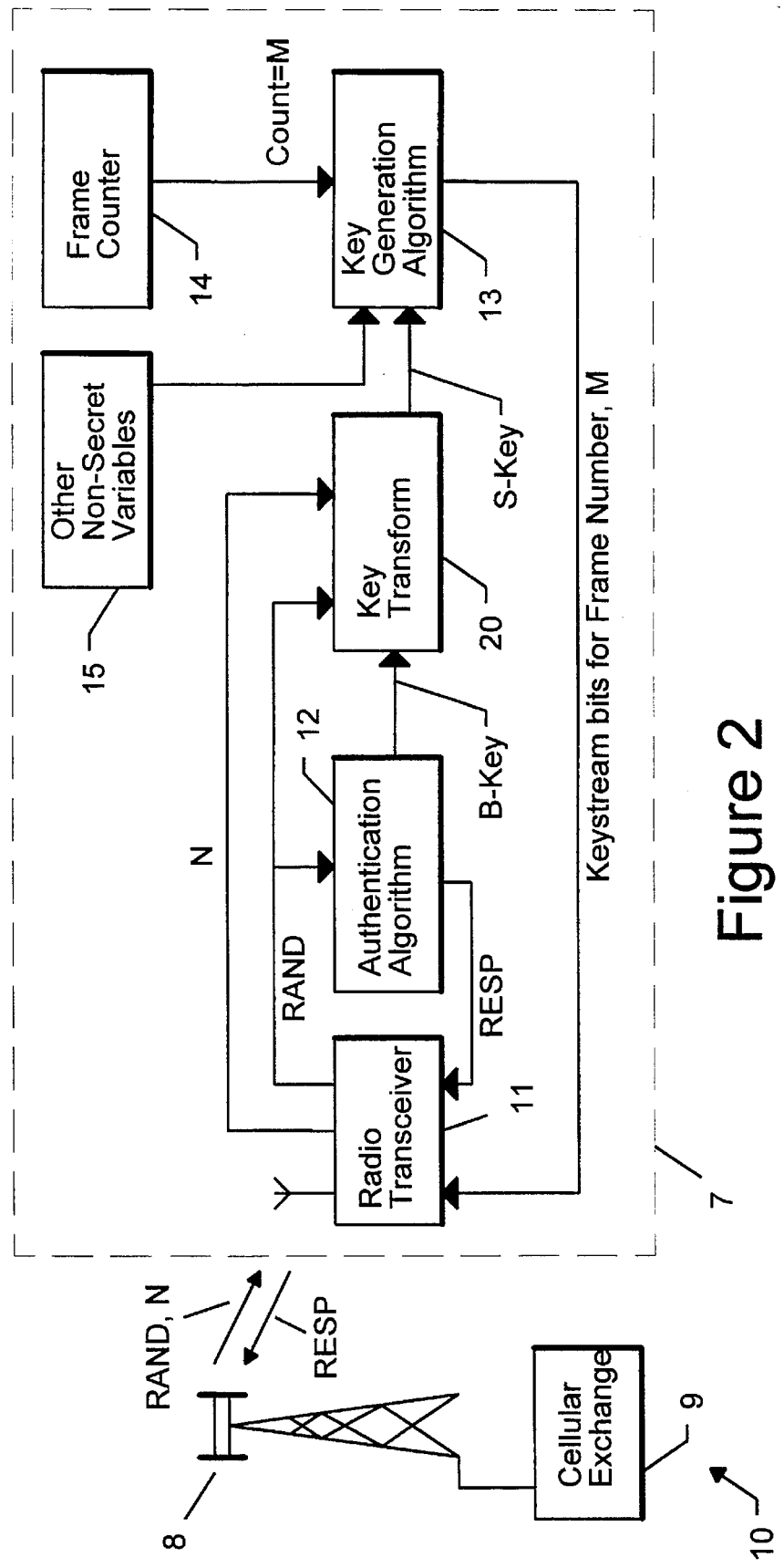
FIG. 2 is a schematic illustration of a radio communication system showing the connection between the authentication and keystream generation system in accordance with the present invention.

The present invention will now be described in conjunction with the preferred embodiment. The present invention is structured as shown in FIG. 2. During the authentication procedure, cellular network 10 transmits a random authentication challenge RAND together with an indication N of how the B-key, as it is now denoted, byproduct of the authentication process 12, shall be further scrambled in key transform process 20 in order to determine the S-key for use by the key generation algorithm 13. The indication N determines one of several ways in which key transform 20 can combine the B-key and RAND to produce S-key. The invention may comprise only two alternate indications, A or B. If the A indication is received, it means a first value of an integer N shall be used by the key transform 20, while if the B indication is received, a second integer value of N shall be used. The A indication might be issued by cellular networks 10 that are not integrated into the North American cellular network 10 for example, while the B indication is issued by base stations 8 within the North American cellular network 10.

Figure 3:
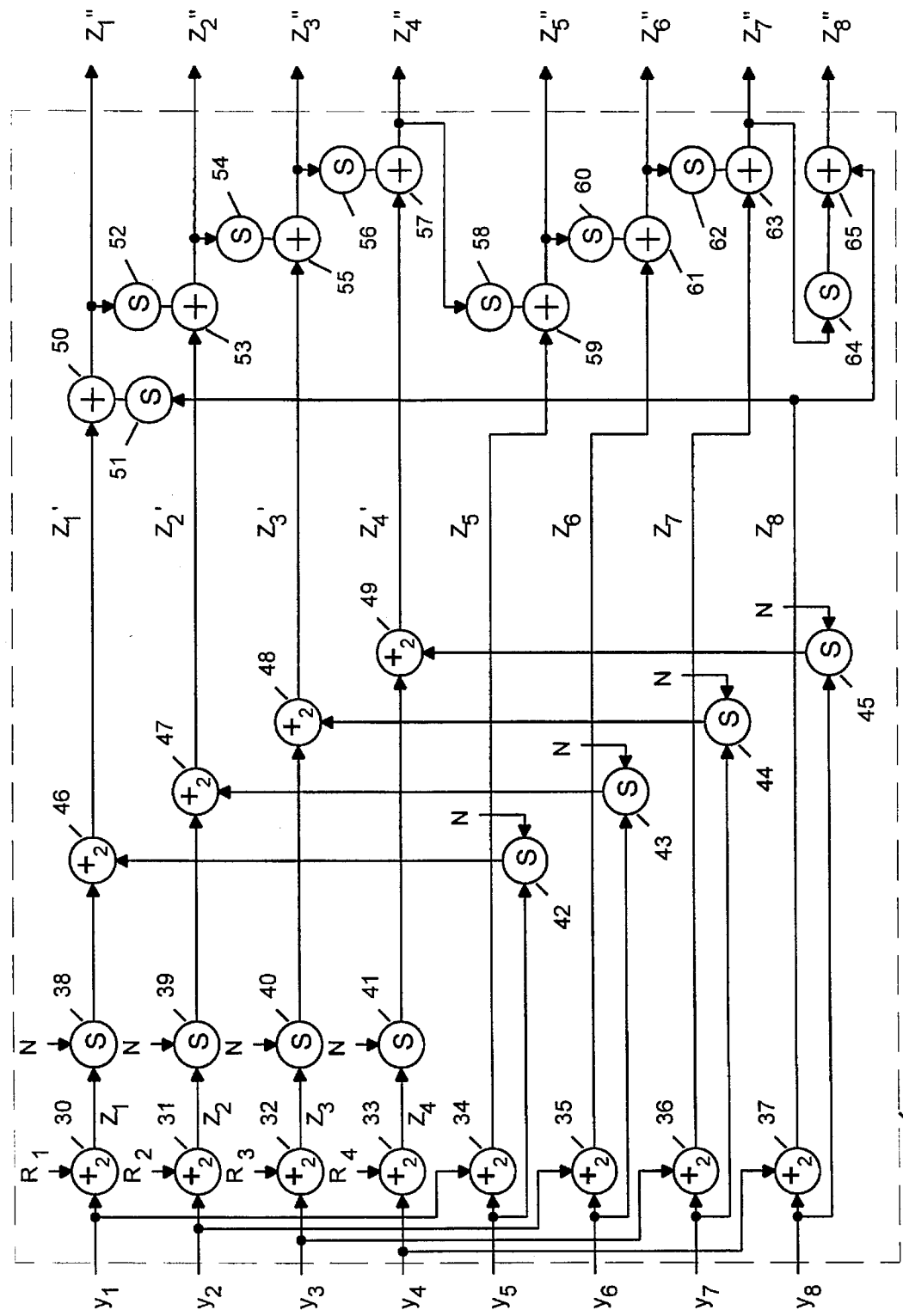
FIG. 3 is a schematic illustration of the Key transformation process in accordance with the present invention.

More detail on how the key transform 20 can use the value of an integer N to modify the creation of the S-key from the B-key will now be given with reference to FIG. 3.

The 64-bit B-key is denoted by the eight so called y-bytes designated y1,y2,y3 . . . , and y8. Likewise, the 32-bit RAND is denoted by four so called r-bytes designated r1,r2,r3, and r4. Byte-wide modulo-2 adders 30 through 37 inclusive combine the y-bytes with the r-bytes (y1 with r1, y2 with r2 . . . , y5 with r1, y6 with r2 . . . , and so on) to produce eight new so called z-bytes designated z1,z2,z3 . . . , and z8. The first four z-bytes z1, z2, z3, and z4 are passed respectively through "S-boxes" 38 through 41 iteratively N times. The last four original B-key y-bytes y5,y6,y7, and y8, respectively are passed directly through S-boxes 42 through 45 iteratively N times. N, as previously mentioned, is included as part of the authentication challenge. An "S-box" refers to a process of substituting an output value for an input value. An S-box may, for example, constitute a 1:1 mapping in which there is provided a unique output value corresponding to every possible input value, or may be a MANY:1 mapping in which several input values map to the same output value. The former is also known as an information-lossless process, whereas the latter is an information-lossy process. In an information-lossy process, the number of possible variations in the output value is reduced compared with the number of possible variations in the input value. In this application, a input value may be passed through the S-box a number of times en route to becoming an output value, and it is undesirable that the number of possible variations in output values be reduced; therefore, an information-lossless process (1:1 S-box) is preferred. By this is meant that the input byte, for example z1, is applied as an 8-bit address to a 256-byte look-up table S to select an output byte stored at the addressed location within S. this constitutes a single iteration (i.e.: N=1). The output byte is then applied again as an address at the input of S and to obtain a new output byte. This constitutes a second iteration (i.e. N=2). The process is repeated the number of iterations indicated by the value of N. The iterated outputs of S-boxes 38-41 and 42-45 are combined respectively in pairs by byte-wide exclusive-OR gates 46-49 to yield z1',z2',z3' and z4'.

Z8 is then passed once (i.e., N=1) through S-box 51 and arithmetically added in adder 50 to z1' to get the first of the eight bytes of S-key, z1". Then z1" is passed once through S-box 52 and arithmetically added in adder 53 to z2' to obtain the second S-key byte z2". This process of passing the last z" byte calculated once through a S-box and adding to the result a z' byte continues until all four z' bytes have been used and then continues in the same fashion as illustrated in FIG. 3 using the remaining z bytes z5, z6, z7, and z8, to yield in total eight bytes of S-key z1", z2", z3", . . . , and z8".

The final scrambling process is reversible and does not therefore constitute a so-called "one-way" function. It is not the purpose of the final scrambling process to ensure that Z' may not be derived from Z", but rather to ensure that any 1-bit change in an input causes on average half the output bits to change. A reversible function has the advantage that it is clearly information-lossless, and does not result in the number of possible output values of Z" (2 to the power 64) being less than the number of possible input values of Z' (also 2 to the power 64). The one-way function property is obtained in the key generation algorithm 13, which ensures that the bits of S-key Z" cannot be derived from observation of its output keystream bits.

The above algorithm assumes availability of four bytes of a random quantity RAND (r1,r2,r3,r4) but is not restricted to this number. If fewer than four bytes of RAND are available, other data may be substituted, such as a logical link number and a traffic direction indicator to bring the number of bytes up to four. The latter is a means of providing independent scrambling keys for each of a number of logical or virtual channels supported by the same radio link, as well as providing independent scrambling keys for each direction of traffic flow (cellular phone 7 to base 8 or base 8 to cellular phone 7).

The above algorithm discloses a means of transforming a key variable used for scrambling cellular mobile telephone transmissions in alternate ways, depending on the network 10 the cellular phone 7 is operating in, by transmitting from the network 10 an indication of how internal variables shall be scrambled by passage through one or more S-boxes. Moreover, it is disclosed above how to save memory for substitution boxes by using, instead of a alternate S-box for a first and a second network indication, the same S-box used iteratively an alternate number of times depending on said network indication in at least part of the key transformation process. Of course, it is always possible to save computation at the expense of memory to record alternate S-boxes, one for use with the first network indication and one for use with the second network indication, as well as the common S-box S which is used in another part of the algorithm with either network indication. The invention however is more intent on saving memory than on saving processing power, as the process of key transformation is only performed once per call at most.

While the present invention has been described with respect to a particular preferred embodiment, those skilled in the art will recognize that the present invention is not limited to the specific embodiment described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for determining a key for scrambling radiotelephone traffic between a radiotelephone terminal and a radiotelephone network the radiotelephone network providing a data or voice communications service, said method comprising the steps of:

a) signal including a random number from said network to said terminal and using the random number to carry out an authentication procedure, said authentication procedure authenticating said terminal to said network and generating a session key, which is a byproduct of the authentication process:

b) transmitting an indication of the type of network providing service to said terminal, said indication indicating the way in which said session key shall be further transformed:

c) transforming said session key into a transformed session key dependent upon the indication of the type of network;

d) using said transformed session key to scramble traffic passed between said network and said terminal.

2. The method according to claim 1, wherein said transforming step comprises the steps of substituting parts of said session key with substituted parts using a substitution table.

3. The method according to claim 2, wherein said substitution table represents a one-to-one mapping.

4. The method according to claim 2, wherein said substitution table depends on said network type indication.

5. The method according to claim 2, wherein said substitution is performed iteratively a number of times responsive to said network indication.

6. A method according to claim 1, wherein said transformed session key is formed from combinations of parts of said session key with parts of said random number.

7. A method according to claim 1, wherein said transformed session key is formed from combinations of pans of said session key with a logical channel number.

8. The method according to claim 1, wherein said transformed session key is formed from combinations of parts of said session key with a traffic direction indication.

9. The method according to claim 6, wherein said combinations are substituted by a value from a substitution table.

10. The method according to claim 9, wherein said substitution table depends on said network type indication.

11. The method according to claim 9, wherein said substitution is performed iteratively a number of times that depends upon said network indication.

12. The method according to claim 7, wherein said combinations are substituted by a value from a substitution table.

13. The method according to claim 12, wherein said substitution table depends on said network type indication.

14. The method according to claim 12, wherein said substitution is performed iteratively a number of times that depends upon said network indication.

15. The method according to claim 8, wherein said combinations are substituted by a value from a substitution table.

16. The method according to claim 13, wherein said substitution table depends on said network type indication.

17. The method according to claim 13, wherein said substitution is performed iteratively a number of times that depends upon said network indication.

18. The method according to claim 1, wherein said transformed session key is formed from combinations of parts of said session key.

19. The method according to claim 18, further including substituting values for said combination using a substitution table.

20. The method according to claim 19, wherein said substitution table is dependent on said network type indication.

21. The method according to claim 19, wherein said substitution is performed iteratively a number of times that depends upon said network indication.

22. A method of determining a key for scrambling radiotelephone traffic between a radiotelephone terminal and a radiotelephone network, comprising:

a) transmitting a signal including a random number from said network to said terminal and using same to carry out an authentication procedure, said authentication procedure authenticating said terminal to said network and generating a session key;

b) transmitting an indication of the type of network providing service to said terminal;

c) transforming said session key to a transformed session key in accordance with said indication of network type by:

d) substituting values for parts of said session key using one of a substitution table and an S-box in accordance with said network type indication;

e) forming a first set of combinations of parts of said session key with parts of said random number, said random number being a logical channel number or traffic direction indication;

f) substituting values for each of said first combinations of parts using one of another substitution table and an S-box that depends on said network type indication;

g) forming a second set of combinations between parts of said session key;

h) combining said substitute values and said second combinations to form said transformed session key; and i) using said transformed session key to scramble traffic passed between said network and said terminal.

23. A radiotelephone terminal for scrambling signals between the radiotelephone terminals and a radiotelephone network, comprising;

a) at least one antenna for receiving and sending signals from and to the radiotelephone network;

b) a radio transceiver coupled to said at least one antenna;

c) a processor coupled to said radio transceiver to authenticate the radiotelephone terminal to the network using a random number received from said network and to provide a session key which is a by product of the authentication; and d) said processor transforming said session key dependent upon an indication received from said network of the type of said network to form a transformed session key, said transformed session key being used by said processor to scramble signals transmitted between the radiotelephone terminal and the network.

24. The radiotelephone terminal of claim 23, wherein said session key is determined from a random number contained in an authentication challenge transmitted to the radiotelephone terminal by the network.

25. The radiotelephone terminal of claim 23, wherein said transformed session key is determined as a function of the network providing services to the terminal.

26. A method for determining a key for scrambling radiotelephone traffic between a radiotelephone terminal and a radiotelephone network the radiotelephone network providing a data or voice communications service, said method comprising the steps of:

a) transmitting a signal including a random number from said network to said terminal and using the random number to carry out an authentication procedure, said authentication procedure authenticating said terminal to said network and generating a session key;

b) transmitting an indication of the type of network providing service to said terminal;

c) transforming said session key into a transformed session key by substituting pans of said session key with substituted parts using a substitution table;

d) using said transformed session key to scramble traffic passed between said network and said terminal.

* * * * *